(12) United States Patent
Morris

(10) Patent No.: US 8,832,990 B2  
(45) Date of Patent: Sep. 16, 2014

(54) AUTOMATIC FISHING APPARATUS

(75) Inventor: Steven T. Morris, Russell (CA)

(73) Assignees: Steven T. Morris, Russell, MB; Paul Waldner, Margaret, MB ( * ) Notice: Subject to any disclaimer, the term of this patent is extended or adjusted under 35 U.S.C. 154(b) by 118 days.

(21) Appl. No.: 13/443,245

(22) Filed: Apr. 10, 2012

(65) Prior Publication Data

US 2013/0263493 A1  Oct. 10, 2013

(51) Int. Cl.
*A01K 89/017* (2006.01)
*A01K 97/10* (2006.01)

(52) U.S. Cl.
USPC .................................. 43/21; 43/21.2; 43/26.1

(58) Field of Classification Search
CPC ..... A01K 97/10; A01K 97/08; A01K 97/125; A01K 97/11; A01K 89/017; A01K 89/012; A01K 89/015; A01K 91/10; A01K 93/02
USPC .................... 43/17, 20, 21, 21.2, 26.1, 15, 16
See application file for complete search history.

(56) References Cited

U.S. PATENT DOCUMENTS

| | | | |
|---|---|---|---|
| 2,760,736 A * | 8/1956 | Mihalko et al. | 242/250 |
| 3,438,594 A * | 4/1969 | Bellefeuille | 242/225 |
| 4,349,977 A | 9/1982 | Brodribb | |
| 4,517,760 A | 5/1985 | Randle | |
| 4,807,386 A * | 2/1989 | Emory, Jr. | 43/27.4 |
| 6,449,895 B1 | 9/2002 | Zabihi | |
| 2008/0282597 A1* | 11/2008 | Gascoingne | 43/17 |

* cited by examiner

*Primary Examiner* — Darren W Ark
*Assistant Examiner* — Kathleen Alker
(74) *Attorney, Agent, or Firm* — Adrian D. Battison; Ade & Company Inc.

(57) ABSTRACT

An apparatus for fishing includes a fishing rod and a separate base unit onto which the rod can be mounted and readily removed. The rod is generally conventional and includes a reel mounted on a rod body for winding in the fishing line with a spool and a hand cranked rotor for winding the line around the spool. The base unit includes a cylindrical holding sleeve for mounting the rod body and a battery driven electric motor for driving the spool independently of the rotor by a drive shaft extending parallel to the sleeve. An adjustable pressure switch for activating the motor is connected between the holder and the base unit so that pulling force on the line pivots the holder around a pivot mount.

14 Claims, 2 Drawing Sheets

AUTOMATIC FISHING APPARATUS

This invention relates to an automatic fishing apparatus.

BACKGROUND OF THE INVENTION

U.S. Pat. No. 4,349,977 (Brodribb) issued Sep. 21, 1982 discloses a commercial fishing apparatus for automatically reeling in a hooked fish which uses an arrangement in which a motor drive shaft is connected through a clutch to the reel and is operated on detection of a strike. The apparatus includes the reel and rod and forms an integrals structure which prevents the fisherman from operating the rod and reel in conventional manual manner.

U.S. Pat. No. 6,449,895 (Zabihi) issued Sep. 17, 2002 discloses a fishing apparatus for automatically reeling in a hooked fish which uses a motor in the butt of the fishing rod which is operated on detection of a strike. This mounting of the motor in the rod and the sensor in the lure makes the fishing rod itself complex and difficult to handle as a conventional fishing rod.

U.S. Pat. No. 4,517,760 (Randle) issued Mar. 21, 1985 discloses a mount which can receive a conventional fishing rod and reel and includes a trigger engagable onto the line so that tension in the line operates the trigger to activate a drive system to the reel. The drive system apparently engages frictionally onto the exterior of the reel while the rod and reel are held in a wire support with the risk that the drive will be inefficient. The use of a trigger engaged onto the line will prevent the user from rapidly removing the rod and reel from the holder for conventional use.

SUMMARY OF THE INVENTION

It is one object of the present invention to provide a fishing rod and holder therefor where the holder acts to detect a strike and to automatically reel in the fish, while the rod can be quickly and simply removed from the holder for the user to continue reeling in the conventional manual operation.

According to the invention there is provided an apparatus for fishing comprising:
  a fishing rod comprising:
    an elongate rod body;
    a fishing line guided along the rod body;
    a reel mounted on the rod body for winding in the fishing line comprising a spool on which the fishing line is wound, a rotor for winding the line around the spool and for guiding the line as it is wound onto the spool and a manually operable handle for driving rotation of the rotor;
  and a base unit for mounting on a support adjacent a body of water in which the fish to be caught are located, the base unit comprising:
    a holder for mounting the rod body on the base unit with the fishing line exposed for entry into the body of water;
    an electric motor for driving the reel;
    a battery for providing electric power to the electric motor;
    a switch for activating the supply of electric power to the electric motor, the switch being arranged such that it is operated to supply power on application of a pulling force to the fishing line by a fish in the body of water;
    the holder and the rod body being arranged such that the rod body can be removed from the holder for manual operation of the reel by manual operation of the handle.

Preferably the switch is on the base unit.

Preferably the switch is located between the rod holder and the base unit so as to be responsive to pulling forces on the rod body.

Preferably the switch is free from the rod body so that the rod body can be simply removed from the rod holder while leaving the switch on the base unit.

Preferably the battery is on the base unit.

Preferably the base unit includes a base member for resting on a support and wherein the holder for the rod body is pivotally mounted in the base member such that a pulling force on the line causes said pivotal movement and the switch is responsive to the pivotal movement.

Preferably the base member includes a receptacle for the holder within which the holder is mounted for pivotal movement.

Preferably the rod holder includes a cylindrical recess for receiving a stub end of the rod body inserted therein by longitudinal movement of the rod body.

Preferably the rod holder is mounted on the base unit so as to support the rod body at an angle upwardly and outwardly over the body of water.

Preferably the rod holder includes a drive shaft generally parallel to the recess such that siding movement of the rod end into the recess causes engagement of a coupling onto the drive shaft.

Preferably the drive shaft includes a portion extending outwardly from a front face of the rod holder.

Preferably the electric motor is arranged for driving rotation of the spool independently of the rotor so that rotation of the spool by the motor causes no movement of the handle and the rotor.

Preferably the spool includes a shaft extension of the spool parallel to the rod body for engaging the a drive shaft of the electric motor.

Preferably there is provided clutch between the spool and the shaft extension to allow the spool to slip if required while the motor is providing a driving action through the shaft extension.

Preferably there is provided an on/off switch on the housing for the motor.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
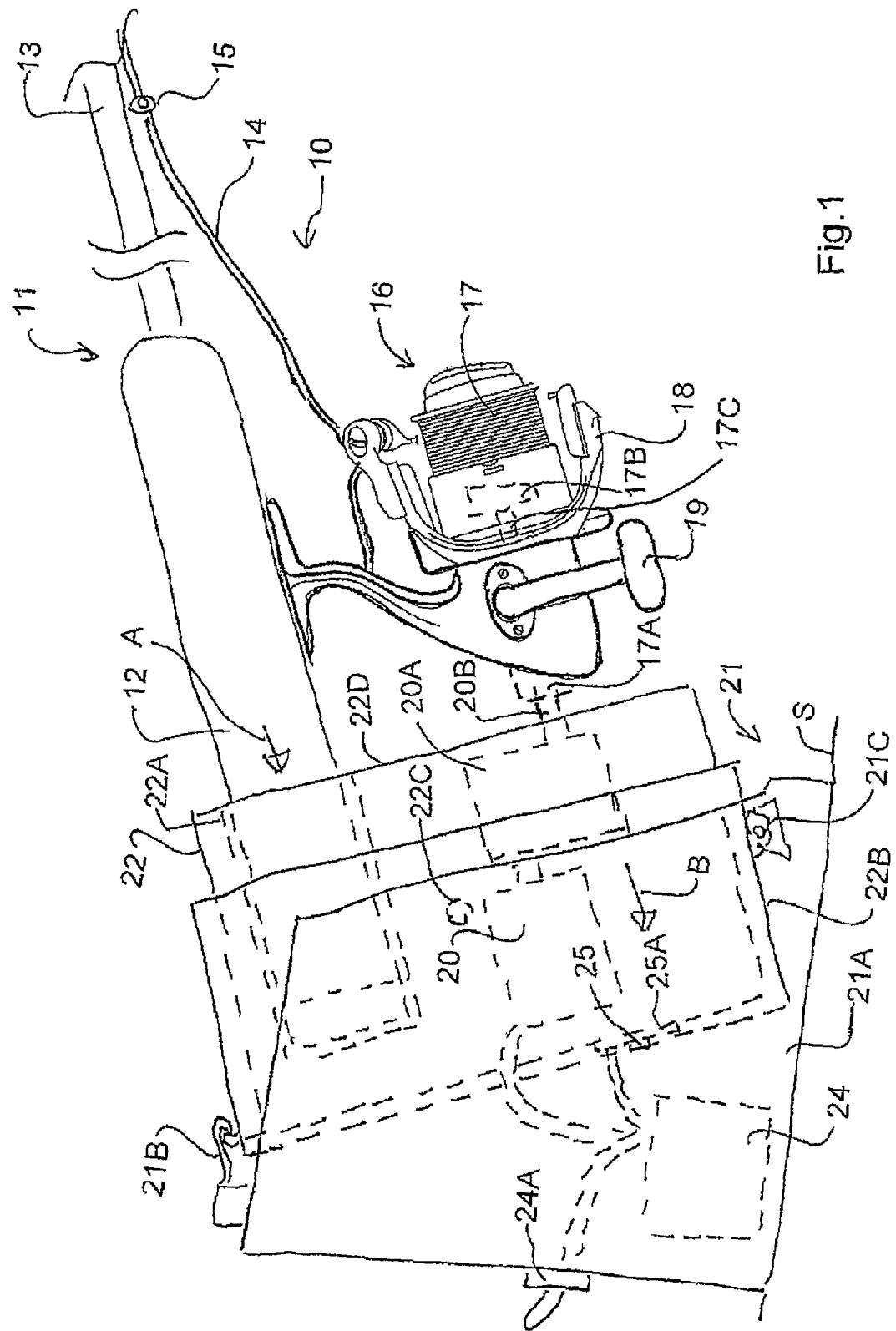
FIG. 1 is a schematic side elevational view of a fishing apparatus according to the present invention.

The apparatus for fishing includes a fishing rod 10 having an elongate rod body 11 with a lower butt end 12 and an upper end 13 and guides 15 for a fishing line 14 guided along the rod body.

A reel 16 is mounted on the rod body adjacent the butt end for winding in the fishing line 14. This includes a spool 17 on which the fishing line is wound, a rotor 18 for winding the line around the spool and for guiding the line as it is wound onto the spool, and a manually operable handle 19 for driving rotation of the rotor. Such reels are of course conventional.

In this construction the reel is supplemented by an additional electric motor 20 for driving rotation of the spool 17 independently of the rotor 18.

A base unit 21 is provided for mounting on a support S adjacent a body of water in which the fish to be caught are located. The base unit 21 can include a tripod mount (not shown) standing from the ground or can be a base plate with clamps (not shown) for attachment to other components such as a deck or boat rail. The shape of the base unit can vary as required.

The base unit 21 includes a holder 22 including cylindrical receptacle 22A for mounting the cylindrical butt end 12 rod body on the base unit by the longitudinal movement along arrow A to allow the butt end to be inserted into the holder and simply removed therefrom for independent use. When inserted, the rod body 11 and the fishing line 14 are presented upwardly and forwardly over the body of water and exposed for entry into the body of water. The rod holder 22 is mounted on the base so as to support the rod body at an angle over the body of water in a conventional fishing orientation. The rod holder 22 remains stationary without any jigging action so that the line is supported and extends into the water in stationary position. The holder 22 is mounted in the base unit 21 22B which allows pivotal movement of the rod holder 22 about a transverse mounting pin 22C connected between the holder 22 and the base unit 21. This allows downwardly and rearward movement of the holder 22 in the direction of arrow B in response to the downward pulling force on the line from a fish caught on the line.

A battery 24 for providing electric power to the electric motor is mounted in suitable location on the base unit. An on off switch 24A is provided on the base unit and provides power to a pressure switch 25 which is provided between the holder 22 and the base unit 21 so that movement of the holder in the direction of the arrow B acts to operate the switch 25 activating the supply of electric power to the electric motor. The switch 25 is arranged such that it is operated to supply power on application of a pulling force to the fishing line by a fish in the body of water. Thus automatically the pulling action by the fish activates the motor to directly drive the spool to reel in the line. The switch can be a contact switch which is activated by the pivotal action of the holder 22 about the base unit 21. In particular the switch can comprise a pin connection switch with an adjustable tension spring 25A so that the amount of force necessary to actual the switch can be adjusted.

The motor 20 drives a gear box 20A which in turn drives an output shaft 20B carried on the gear box and extending outwardly from a front face 22D of the holder 22. The axis of the shaft 20B is parallel to the axis of the cylindrical receptacle 22A so that longitudinal movement of the butt into the cylindrical receptacle acts to engage a coupling 17A of the drive shaft 17C to the spool 17 which drives rotation of the spool through a clutch 17B.

The holder 22 and the rod body 11 are arranged such that the rod body 11 can be removed from the holder simply by the user grasping and pulling the rod in the event that a fish is detected by the user. The motor drive to the spool is simply disconnected by pulling the rod which disconnects the coupling 17A from the drive shaft 20B. In this situation power to the spool is disconnected and the user can continue to operate the fishing rod in conventional manner by operation of the reel by manual operation of the handle.

Figure 2:
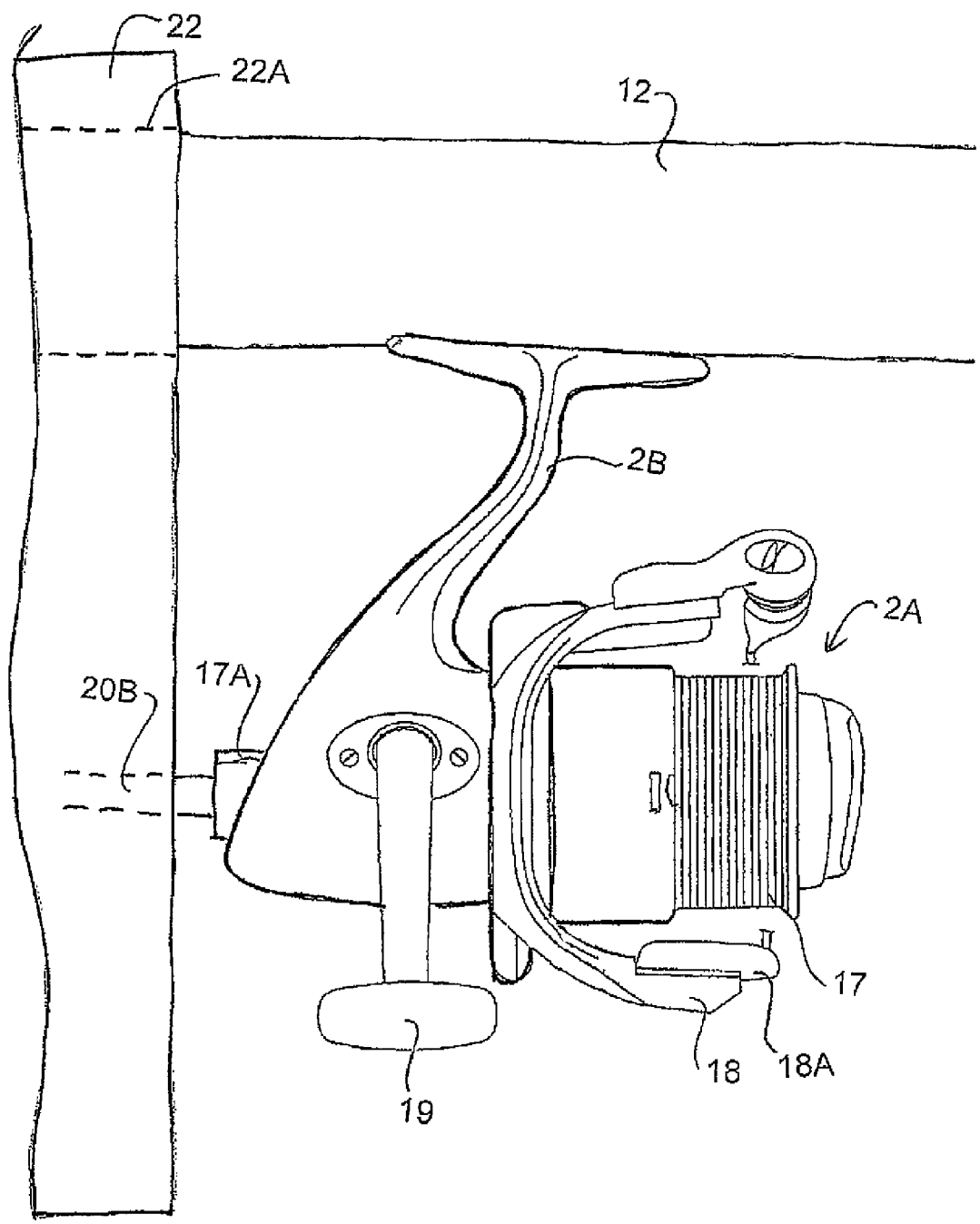
FIG. 2 is a schematic side elevational view on an enlarged scale of the reel of the rod of FIG. 1.

The spinning reel, is shown in more detail in FIG. 2 and includes the reel unit in which the handle 19 is rotatably attached to drive the rotor 18 around the spool 17 in conventional manner. During manual operation the spool does not rotate but moves axially so that the rotation of the arm 18A of the rotor around the spool 17 acts to wind the line onto the spool. The rotor is rotatably attached on the front of the reel unit. The spool 17 onto whose outer circumference fishing line is wound and is disposed on the front of the rotor 18, where it moves in a back and forth reciprocating manner.

The reel unit includes a reel body 2A, and a rod-mounting leg 2B that extends diagonally up/forward from the reel body 2A and is attached to the rod handle 12. The reel body 2A has an interior space containing the shaft 17C and the clutch 17B. A rotor driving mechanism and an oscillating mechanism (not shown) operated by the handle 19 are provided within the space. The rotor driving mechanism is rotated in cooperation with the rotation of the handle 1. The oscillating mechanism winds fishing line uniformly onto the spool by pumping the spool back and forth.

The switch 25 is thus provided on the base unit and is free from the line and from the rod itself so that the rod can be pulled away immediately without any complexity of separating the switch from the rod structure. In particular the switch is located between the rod holder and the base unit so as to be responsive to pulling forces on the rod body.

The base unit 21 includes a base member 21A for resting on a support and the holder 22 for the rod body is pivotally mounted in the base unit 21 such that a pulling force on the line causes said pivotal movement and the switch is responsive to the pivotal movement. The base unit 21 includes a receptacle 22B for the holder 22 within which the holder 22 is mounted for pivotal movement on the pin 22C.

The receptacle 22B is carried on the base unit 21 in fixed position but can be unlatched by an over-center latch 21B for opening pivotal movement about a transverse pivot mount 21C. This movement acts to expose the battery and wiring within the base unit 21 for replacement and repair. The motor is carried on the holder 22 so that it pivots with the holder 22 and receptacle 22A.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for fishing comprising:
 a fishing rod comprising:
  an elongate rod body;
  a fishing line guided along the rod body;
  a reel mounted on the rod body for winding in the fishing line comprising a spool on which the fishing line is wound, a rotor for winding the line around the spool and for guiding the line as it is wound onto the spool and a manually operable handle for driving rotation of the rotor;
 and a base unit for mounting on a support adjacent a body of water in which the fish to be caught are located, the base unit comprising:
  a rod holder for mounting the rod body on the base unit with the fishing line exposed for entry into the body of water;
  an electric motor for driving the reel;
  a battery for providing electric power to the electric motor;
  a switch for activating the supply of electric power to the electric motor, the switch being arranged such that it is operated to supply power on application of a pulling force to the fishing line by a fish in the body of water;

the rod holder and the rod body being arranged such that the rod body can be removed from the rod holder for manual operation of the reel by manual operation of the handle;

wherein the electric motor is arranged for driving rotation of the spool independently of the rotor so that rotation of the spool by the motor causes no movement of the handle and the rotor.

2. The apparatus according to claim 1 wherein the spool includes a shaft extension of the spool parallel to the rod body for engaging the drive shaft of the electric motor.

3. The apparatus according to claim 2 wherein there is provided a clutch between the spool and the shaft extension to allow the spool to slip if required while the electric motor is providing a driving action through the shaft extension.

4. An apparatus for fishing comprising:
a fishing rod comprising:
an elongate rod body;
a fishing line guided along the rod body;
a reel mounted on the rod body for winding in the fishing line comprising a spool on which the fishing line is wound, a rotor for winding the line around the spool and for guiding the line as it is wound onto the spool and a manually operable handle for driving rotation of the rotor;
and a base unit for mounting on a support adjacent a body of water in which the fish to be caught are located, the base unit comprising:
a rod holder for mounting the rod body on the base unit with the fishing line exposed for entry into the body of water;
an electric motor for driving the reel;
a battery for providing electric power to the electric motor;
a switch for activating the supply of electric power to the electric motor, the switch being arranged such that it is operated to supply power on application of a pulling force to the fishing line by a fish in the body of water;
the rod holder and the rod body being arranged such that the rod body can be removed from the rod holder for manual operation of the reel by manual operation of the handle;
wherein the rod holder includes a generally cylindrical receptacle for receiving a stub end of the rod body inserted therein by longitudinal movement of the rod body;
and wherein the rod holder includes a drive shaft of the electric motor generally parallel to the generally cylindrical receptacle such that sliding movement of the stub end into the generally cylindrical receptacle causes engagement of a coupling onto the drive shaft.

5. The apparatus according to claim 4 wherein the switch is on the base unit.

6. The apparatus according to claim 4 wherein the switch is located between the rod holder and the base unit so as to be responsive to pulling forces on the rod body.

7. The apparatus according to claim 4 wherein the switch is free from the rod body so that the rod body can be simply removed from the rod holder while leaving the switch on the base unit.

8. The apparatus according to claim 4 wherein the battery is on the base unit.

9. The apparatus according to claim 4 wherein the base unit includes a base member for resting on a support and wherein the rod holder for the rod body is pivotally mounted in the base member such that a pulling force on the line causes pivotal movement and the switch is responsive to the pivotal movement.

10. The apparatus according to claim 9 wherein the base member includes a receptacle for the rod holder within which the rod holder is mounted for pivotal movement.

11. The apparatus according to claim 4 wherein the drive shaft includes a portion extending outwardly from a front face of the rod holder.

12. The apparatus according to claim 4 wherein the electric motor is arranged for driving rotation of the spool independently of the rotor so that rotation of the spool by the motor causes no movement of the handle and the rotor.

13. The apparatus according to claim 12 wherein the spool includes a shaft extension of the spool parallel to the rod body for engaging the drive shaft of the electric motor.

14. The apparatus according to claim 13 wherein there is provided a clutch between the spool and the shaft extension to allow the spool to slip if required while the electric motor is providing a driving action through the shaft extension.

* * * * *